United States Patent [19]

Polato et al.

[11] Patent Number: 5,026,608
[45] Date of Patent: Jun. 25, 1991

[54] PROCESS FOR IMPROVING THE ADHESIVE PROPERTIES OF POLYOLEFIN PRODUCTS

[75] Inventors: Felice Polato; Giuliano Cecchin, both of Ferrara, Italy

[73] Assignee: Himont Incorporated, Wilmington, Del.

[21] Appl. No.: 359,232

[22] Filed: May 31, 1989

[30] Foreign Application Priority Data

May 31, 1988 [IT] Italy .................... 20812 A/88

[51] Int. Cl.$^5$ .................. B32B 9/04; B32B 27/08; B05D 3/06; B05D 7/00
[52] U.S. Cl. ............................ 428/484; 428/514; 428/516; 428/518; 428/520; 427/54.1; 427/412.3
[58] Field of Search ............... 427/54.1, 412.3; 428/484, 514, 516, 518, 520

[56] References Cited

U.S. PATENT DOCUMENTS

| | | | |
|---|---|---|---|
| 3,036,930 | 5/1962 | Grimminger et al. | 427/54.1 |
| 3,988,500 | 10/1976 | Jahn | 427/412.3 |
| 4,121,006 | 10/1078 | Harada et al. | 427/412.3 |
| 4,129,676 | 12/1978 | Guglielmo, Sr. | 427/412.3 |
| 4,201,642 | 5/1980 | Nowak | 427/54.1 |
| 4,303,697 | 12/1981 | Baseden | 428/520 |
| 4,880,849 | 11/1989 | Poole et al. | 427/54.1 |

FOREIGN PATENT DOCUMENTS

| | | | |
|---|---|---|---|
| 4009089 | 12/1969 | Japan | 427/412.3 |
| 1076535 | 4/1986 | Japan | 427/54.1 |
| 8805346 | 7/1988 | PCT Int'l Appl. | 427/54.1 |

*Primary Examiner*—Shrive Beck
*Assistant Examiner*—Marianne L. Padgett

[57] ABSTRACT

The adhesive properties of polyolefin products are improved by submitting said products to a surface modification process which includes the following steps:

A) application to the polyolefin product surface of a layer of one or more photosensitive materials selected from:
  1) Chloroparaffins containing 5 to 80 wt % of chlorine and having an average molecular weight greater than 200;
  2) vinyl chloride homopolymers and copolymers containing 25 to 80 wt % of chlorine and having K values between 40 and 60; and
  3) vinylidene chloride homopolymers and copolymers; and B) exposure of the layer to ultraviolet radiation.

The product treated in this manner is ready for painting or coating with various materials.

20 Claims, No Drawings

PROCESS FOR IMPROVING THE ADHESIVE PROPERTIES OF POLYOLEFIN PRODUCTS

This invention relates refers to a process for surface modification of polyolefin products designed to improve the adhesive properties of the products, to coating materials and in particular to paints.

It's well known that to paint or coat products made of polyolefin materials with good results, one needs to modify the surface with suitable treatments.

In fact, polyolefin materials which do not contain polar groups for physical adhesion have an elevated degree of inertia to chemical reactions with other polymers or monomers as well as with solvents.

Various solutions are already known in the art for obtaining the adhesion of various materials to the surface of polyolefins without considerable impact to the chemical and mechanical properties of the polyolefins themselves.

Significant examples of broad application processes are surface flame treatment with subsequent application of primers, or plasma treatment or corona discharge, or the application of oxidizing solutions to the surface, like for instance solutions of $K_2Cr_2O_7$ in $H_2SO_4$ or the use of photoactivators or photosensitive materials, U.S. Pat. No. 3,764,370 describes process for the surface modification of polyolefin products which includes the application of a dilute solution of a photoactivator especially selected among the multiple rings ketones and hydrocarbons, the drying, and the exposure to ultraviolet radiation. Specific examples of compounds of the kind mentioned above are benzophenone and methyl ethyl ketone.

However, the adhesion of paints and various coating. materials to surfaces treated by this method is not satisfactory.

Certain chlorinated hydrocarbons like methylene chloride, trichloroethylene, and chloroform can also be used in this type of surface treatment, but the results as far as adhesion of coating materials to the polyolefins is concerned are also very inferior.

According to another procedure, described in U.S. Pat. No. 4,303,697, the surface of polyolefin products is prepared for painting with a treatment which includes the coating with a thin layer of a photosensitive material consisting of chlorinated polypropylene, containing from about 5 to 25 wt % of chlorine and having a number average molecular weight between 5,000 and 50,000, and subsequent exposure to ultraviolet radiation.

Each one of these solutions is satisfactory for some applications, but not for all, because the different composition of the various polyolefins in some cases, or the form of the products in other case, can be critical factors for the efficiency or uniformity of the treatment. These problems are particularly critical in the case of products which require a high degree of adhesion when they are subjected to thermal shocks and exposed to high levels of humidity.

Therefore, there is a definite need for a process which will give satisfactory results as regards reliability and versatility, while also obtaining high levels of adhesion for paints and other materials to prolyolefin products having a complex shape. This is provided by the process of surface modification of the present invention comprising the following steps:

A) application to the product's surface of a layer of one or more photosensitive materials selected from the group consisting of:
1) chloroparaffins containing 5 to 8 wt % of chlorine and having an average molecular weight greater than 200;
2) polyvinyl chloride, optionally postchlorinated, and vinyl chloride copolymers, with both polymeric materials having a chlorine content between 25 and, 80 wt % and K values included between 40 and 60; and
3) vinylidene chloride homopolymers and copolymers; and B) exposure of the layer to ultraviolet radiation.

Excellent results can be obtained with regard to the surface adhesion of paints and other materials to polyolefin products by using the above mentioned process. The polyolefins suitable for use in manufacturing products include crystalline polyolefins such as polypropylene, polyethylene, partially crystalline copolymers of propylene with ethylene, butene or other alpha olefins, or with dienes, the latter cross-linked if necessary, and amorphous olefinic polymers such as copolymers of ethylene with propylene or other alpha olefins containing, if desired, small amounts of dienes.

The polypropylene is preferably constituted of macromolecules having prevailingly isotactic structure.

Specifically, polypropylene with a high isotactic index can be a homopolymer or a composition obtained by sequential polymerization of propylene, and mixtures of propylene and ethylene or other olefins, with stereospecific catalysts.

Such polymers can be mixed with each other or, as alloys, with other polymers; and can contain various types of mineral fillers such as talc, calcium carbonate, and micas; reinforcing agents, like glass fibers, mineral, metallic or polymeric fibers; and dyes.

The photosensitive materials are applied according to known methods. They are preferably used in dilute solution, from 0.5 to 5 wt %, particularly from 1 to 2 wt %, in suitable solvents, or mixtures thereof, such as aromatic and aliphatic hydrocarbons, also chlorinated, and tetrahydrofuran.

Said solutions may be applied to the surface to be treated by spraying, for example, with a micronized jet or a spray gun, or by immersing the product directly in the solutions.

If necessary the surface to be treated may be washed, with water and detergents or organic solvents, and dried before the application of the photosensitive material.

Generally the thickness of the layer of photosensitive material is less than 1–2 $\mu$m, preferably between 0.2–0.4 $\mu$m.

Examples of chloroparaffins which can be used according to the present invention are products known by the following trade marks: Cloparin (produced by Caffaro), Cereclor (ICI Ltd.), and Chlorowax (Diamond Shamrock Corporation).

As previously stated, such chloroparaffins contain 5 to 80 wt % of chlorine, preferably 30 to 70%, and their average molecular weight is greater than 200, preferably between 400 and 2000.

Specific examples of chloroparaffins which gave good results are Cloparin S70, which has an average molecular weight of 1035 and a chlorine content of about 70%, Cereclor 70 and 70L, for which are given respectfully the average empirical formulas of $C_{24} H_{29}$ $Cl_{21}$ and $Chd\ 12\ H_{15}\ Cl_{11}$ respectively and Chlorowax 70S.

Examples of vinyl chloride copolymers are copolymers with vinyl acetate or other monomers, such as methyl methacrylate and vinyl alcohol. Vinyl chloride homopolymers and copolymers may also be used in mixtures with small quantities (up to 10% by wt for instance) of other polymers, such as methacrylate/butadiene/styrene copolymers.

Examples of vinylidene chloride copolymers are the vinylidene chloride/acrylonitrile copolymers.

Specific examples of vinylidene chloride homopolymers and copolymers with vinyl chloride or acrylonitrile are the products known as Saran, by Dow Chemical Company.

Before subjecting the above mentioned photosensitive materials to ultraviolet radiation the excess solvent used for the application of such materials as a dilute solution, has to be removed by spontaneous evaporation at room temperature, or forced evaporation with ventilation and/or heating.

The products treated in such manner are then subjected ultraviolet radiation using lamps having an emission band preferably between 200 and 400 nm, like for instance mercury vapor lamps.

The surface treated with the photosensitive material must receive, through ultraviolet radiation, enough energy to have a high degree of photochemical conversion of the photosensitive material, without triggering perceptible degradation phenomena in the underlying polyolefin.

The optimum radiation dose depends essentially on the type and quantity of the photosensitive material applied to the surface of the product which has to be treated.

As an example, when the photosensitive material is applied as a 2% wt solution, the optimum radiation dose may be between 0.2 and 5 $J/cm^2$.

The products treated in such manner can easily be painted, glued or coated with various materials.

The process described above produces, in the polyolefin products, a surface modification characterized, among other things, by a noticeable stability at normal environmental conditions and may be washed with nonaggressive solvents. The painting and application of coating materials, therefore, may be done at a much later date.

In the case of painting, there is also a high resistance to "blistering", or, in other words, to the formation of small bubbles on the paint film following a prolonged contact of the painted piece with water or steam.

The following examples are given in order to demonstrate, but not limit, the present invention.

EXAMPLES 1-9

Used as specimen are strips 20 cm long, 7 cm wide and 0.3 cm thick, obtained by injection molding at a temperature of 250° C., of Moplen SP 179 polypropylene (examples 1-4) and Moplen SP 151 polypropylene (examples 6-9) (shock-resistant polypropylenes modified with ethylene/propylene rubber, products of HIMONT Italia S.p.A.).

The melt index values, flexural rigidity and Izod resiliance, are, respectively, 8 g/10 min, 1000 MPa and 500 J/m for Moplen SP 179, and 3.5 g/10 min, 750 MPa and 500 J/m for Moplen SP 151.

The strips are immersed in a solution of Cloparin 70 in xylene for 4 seconds.

The strips are then taken out of the solution, dried at room temperature for about 10 minutes, and subsequently irradiated perpendicularly to the surface with an ultraviolet lamp located at a distance of 20 cm, making two or more passes at a speed of 3 meters per minute.

A lamp made by Societa Aermeccanica Giardina I.S.T. type 200/1 mod., 20 cm. long is used for the irradiation.

The Cloparin S 70 concentrations in xylene solutions and the number of passes under the ultraviolet lamp are shown in Table I for each example.

After irradiation, the specimens are painted using polyacrylic bicomponent paints with isocyanic hardener The following tests are made on the painted specimens:

Paint Adhesion

The measure of adhesion of the paint is made by determining the maximum load necessary to cause detachment of the paint from the polymer on a round area 2 cm. in diameter.

For this purpose the base of a small steel cylinder is glued to the painted surface and an adequate tensile stress is applied in the direction of the axis of the cylinder. The material used for gluing the cylinder is the bicomponent epoxy resin "Acciaio Rapido" made by Bostick.

Resistance to Blistering

By "Blistering" is meant the formation of small bubbles on a paint film caused by prolonged contact of the painted pieces with water (liquid or steam).

The specimen is immersed in distilled water at 55° C. and the time it takes for the first blister to be seen with the naked eye is recorded. The test can be interrupted and the results considered positive after 200 hours.

The resistance to blistering of the painted pieces is considered of maximum importance for the application to automotive and motorcycle exterior body parts.

The results of the paint's adhesion and resistance to blistering tests are reproduced for each example in Table I.

TABLE I

| Ex No. | Concentration Cloparin S70 (% by wt) | Number of passes | Adhesion (kg) | Blistering (hours) |
| --- | --- | --- | --- | --- |
| 1 | 1 | 2 | 165 | >200 |
| 2 | 1 | 4 | 220 | >200 |
| 3 | 2 | 2 | 190 | >200 |
| 4 | 2 | 4 | 220 | >200 |
| 5 | 2 | 4 | 115 | >200 |
| 6 | 2 | 8 | 130 | >200 |
| 7 | 4 | 2 | 100 | >200 |
| 8 | 4 | 4 | 145 | >200 |
| 9 | 4 | 8 | 150 | >200 |

EXAMPLES 10 AND 11

The specimens are of the same type as those for examples 1-4.

Said specimens are subjected to surface treatment through an application of photosensitive materials and subsequently are exposed to ultraviolet rays using the same operating methods of examples 1-9.

The photosensitive materials used are polyvinyl chloride AC 404/D made by TPV of Argenta (Ferrara) (example 10) and the vinylidene chloride/acryloitrile Saran F 310 E made by Dow Chemical Company (example 11) in a 2% tetrahydrofuran solution.

The specimens treated in this manner are painted with bicomponent polyacrylic paints with isocyanic hardener.

The number of passes under the ultraviolet lamp, the results of the paint adhesion tests and the resistance to blistering are shown, for each example, in Table II.

TABLE II

| Ex. No. | Number of passes | Adhesion (kg) | Blistering (hours) |
|---|---|---|---|
| 10 | 4 | 110 | >200 |
| 11 | 2 | 190 | >200 |

COMPARISON EXAMPLE 1

The same procedure of example 1 is followed using, as photosensitive material, the chlorinated polyolefin CP-313-3, marketed by Eastman Chemical International Company.

The results of the adhesion and the blister resistance tests are, respectively, 65 kg and 50 hours.

EXAMPLES 12–16

The specimens used are of the same type as per example 1. They are treated with photosensitive material and subjected to ultraviolet radiation according to the methods described in example 1, with the difference that the specimens are kept still under the lamp for an exposure period of a few seconds. In this case, therefore, the quantity of energy received by the specimen through ultraviolet radiation can be estimated based on the exposure times instead of the number of passes under the lamp.

The photosensitive materials are used in a xylene solution. The specimens treated in this manner are then coated, by spraying with a spray gun, with a bicomponent polyurethane adhesive produced by National Starch and Chemical GmbH, which consists of a polyurethane base and an isocyanic hardener.

Adhesion tests of the adhesive to the polyolefin are made using the same method described in examples 1–9 for the paint adhesion tests. In this case the metallic cylinder is glued to the adhesive layer, still using the epoxy resin "Acciaio Rapido" made by Bostick.

These tests are made 24 hours after spraying and annealing in a hygrostatic cell at 90° C. for 24 hrs.

In Table III are shown, for each example, the type and concentration in solution of the photosensitive materials used, the time of exposure to ultraviolet radiation, the adhesive used, with weight ratio between the polyurethane base and isocyanate hardener specified in parenthesis, as well as the results of the adhesion tests.

TABLE III

| Ex. no. | Photosensitive Materials | Concentration (wt %) | Exposure time (seconds) | Adhesive | Adhesion (1) (kg) | Adhesion (2) (kg) |
|---|---|---|---|---|---|---|
| 12 | Cloparin S 70 | 1.5 | 35 | U195/D200 (100/7) | >115 | 145 |
| 13 | Cloparin S 70 | 1.5 | 35 | U345/D200 (100/7) | >110 | 140 |
| 14 | Cloparin S 70 | 1.5 | 35 | Z43S113/D133 (100/7) | >90 | 120 |
| 15 | Saran F310E | 2 | 20 | 10042/C10025 (100/15) | >70 | — |
| 16 | Saran F310E | 2 | 20 | 1175/DC80 | >100 | — |

(1) Adhesion test 24 hrs after spraying.
(2) Adhesion test 24 hrs after spraying and annealing at 90° C.

In the case of the adhesion tests 24 hrs after spraying, the maximum load necessary to cause the separation of the adhesive from the polyolefin must be considered greater than the values reported in Table III, because at such load values separation between the metallic cylinder and the layer of adhesive occurs.

EXAMPLE 17

A specimen of the same type as the one in example 1 is used. This specimen is treated with a 2% Saran F 310 E xylene solution, and exposed to ultraviolet radiation with the same operative method as per example 15.

The specimen thus treated is spray coated with the polyurethane adhesive Sestriere, manufactured by Societa Sestriere di Torino.

On the adhesive layer is applied, by heat compression, a multilayered PVC film 2 mm in diameter, previously heated at 80° C. After 24 hours of conditioning at room temperature a right angle peeling test is made applying traction to the PVC film at a speed of one cm per minute on a separation front of 5 cm.

The cohesive breakage of the PVC film is detected at the unit charge of 17 kg/cm, without separation of the film from the support.

We claim:

1. A process for the surface modification of polyolefin products comprising the following steps:
  A) application to the product surface of a layer of one or more photosensitive materials selected from the group consisting of
    1) chloroparaffins containing 5 to 80 wt % of chlorine and having an average molecular weight between 400 and 2000;
    2) polyvinyl chloride, having a chlorine content between 25 and 80 wt %, and a K value between 40 and 60; and
    3) vinylidene chloride homopolymers and copolymers; and
  B) exposure of the surface layer of photosensitive material to ultraviolet radiation.

2. The process of claim 1 wherein the polyolefin in the product is selected from the group consisting of polypropylene having a high isotactic index, polyethylene, partially crystalline propylene copolymers with ethylene, butene or other alpha olefins or with dienes, amorphous propylene copolymers with ethylene, and, optionally, with smaller proportions of a diene, and their mixtures.

3. The process of claim 1 wherein the photosensitive material is applied in solution diluted with an organic solvent.

4. The process of claim 3, wherein the concentration of photosensitive material in solution varies from 0.5 to 5 wt %.

5. The process of claim 1 wherein the product surface is washed and dried before applying the photosensitive material.

6. The process of claim 1 wherein the exposure to ultraviolet radiation is done with a lamp having an emission band between 200 and 400 nm.

7. The process of claim 1 wherein the chloroparaffins have a chlorine weight content of 30 to 70%.

8. The process of claim 1 wherein the vinyl chloride homopolymers contain up to 10% by of a methacrylate/butadiene/styrene copolymer.

9. The process of claim 1 wherein a vinylidene chloride/acrylonitrile copolymer is used as the vinylidene chloride copolymer.

10. The process of claim 1 wherein said photosensitive material is a chloroparaffin.

11. A polyolefin product treated according to the process of claim 1.

12. A polyolefin product treated according to the process of claim 2.

13. A polyolefin product treated according to the process of claim 3.

14. A polyolefin product treated according to the process of claim 4.

15. A polyolefin product treated according to the process of claim 7.

16. The polyolefin product of claim 11 wherein said product is painted or covered with a coating material.

17. The polyolefin product of claim 12 wherein said product is painted or covered with a coating material.

18. The polyolefin product of claim 13 wherein said product is painted or covered with a coating material.

19. The polyolefin product of claim 14 wherein said product is painted or covered with a coating material.

20. The polyolefin product of claim 15 wherein said product is painted or covered with a coating material.

* * * * *

UNITED STATES PATENT AND TRADEMARK OFFICE
CERTIFICATE OF CORRECTION

PATENT NO. : 5,026,608  
DATED : June 25, 1991  
INVENTOR(S) : Felice Polato et al.

Page 1 of 2

It is certified that error appears in the above-identified patent and that said Letters Patent is hereby corrected as shown below:

At col. 1, line 5, delete "refers".

At col. 1, line 55, change "case" to --cases--.

At col. 1, line 65, change "prolyolefin" to --polyolefin--.

At col. 2, line 4, change "8" to --80--.

At col. 2, line 10, delete the comma.

At col. 3, line 1, change "Chd 12 $H_{15}Cl_{11}$" to --$C_{12}H_{15}Cl_{11}$,--.

At col. 3, line 23, after "jected" insert --to--.

At col. 4, line 15, insert a period after "ener".

At col. 4, line 68, change "chloride/acryloitrile" to --chloride/acrylonitrile--.

At col. 5, line 59, delete the comma.

At col. 6, line 1, change "isocyanate" to --isocyanic--.

UNITED STATES PATENT AND TRADEMARK OFFICE
CERTIFICATE OF CORRECTION

PATENT NO. : 5,026,608

DATED : June 25, 1991

INVENTOR(S) : Felice Polato, et al

It is certified that error appears in the above-identified patent and that said Letters Patent is hereby corrected as shown below:

At col. 7, line 14, after "by" insert --wt--

Signed and Sealed this

Fifth Day of January, 1993

*Attest:*

DOUGLAS B. COMER

*Attesting Officer*  Acting Commissioner of Patents and Trademarks